US 8,678,145 B2

(12) United States Patent
Camilo-Martinez et al.

(10) Patent No.: US 8,678,145 B2
(45) Date of Patent: Mar. 25, 2014

(54) PNEUMATICALLY OR ELECTROMECHANICALLY ACTUATED DISC BRAKE

(75) Inventors: Jose Camilo-Martinez, Unterhaching (DE); Michael Peschel, Schoengeising (DE); Robert Trimpe, Wessling (DE)

(73) Assignee: KNORR-BREMSE Systeme fuer Nutzfahrzeuge, Munich (DE)

( * ) Notice: Subject to any disclaimer, the term of this patent is extended or adjusted under 35 U.S.C. 154(b) by 230 days.

(21) Appl. No.: 13/277,323

(22) Filed: Oct. 20, 2011

(65) Prior Publication Data

US 2012/0073912 A1    Mar. 29, 2012

Related U.S. Application Data

(63) Continuation of application No. PCT/EP2010/002339, filed on Apr. 16, 2010.

(30) Foreign Application Priority Data

Apr. 21, 2009  (DE) .................. 10 2009 018 223

(51) Int. Cl.
*F16D 65/56*    (2006.01)
(52) U.S. Cl.
USPC ..................... 188/72.7; 188/71.8; 188/72.9
(58) Field of Classification Search
USPC ............... 188/71.7–71.9, 72.8, 72.9
See application file for complete search history.

(56) References Cited

U.S. PATENT DOCUMENTS

| | | | |
|---|---|---|---|
| 5,449,052 A | 9/1995 | Macke et al. | |
| 5,927,445 A | 7/1999 | Bieker et al. | |
| 6,354,407 B1* | 3/2002 | Heinlein et al. | 188/71.1 |
| 7,926,626 B2 | 4/2011 | Iraschko | |
| 2004/0149527 A1* | 8/2004 | Norman et al. | 188/71.8 |

FOREIGN PATENT DOCUMENTS

| | | |
|---|---|---|
| DE | 93 12 121.0 U1 | 2/1994 |
| DE | 43 23 292 A1 | 1/1995 |
| DE | 94 22 342 U1 | 5/2000 |
| DE | 10 2004 037 771 A1 | 3/2006 |
| EP | 1 319 858 A2 | 6/2003 |
| EP | 1 039 166 B1 | 6/2005 |
| GB | 2 442 552 A | 4/2008 |
| WO | WO 96/34216 A1 | 10/1996 |

OTHER PUBLICATIONS

International Preliminary Report on Patentability dated Nov. 10, 2011 (Seven (7) pages).
Corresponding International Search Report dated Aug. 11, 2010 with English translation.

* cited by examiner

*Primary Examiner* — Christopher Schwartz
(74) *Attorney, Agent, or Firm* — Crowell & Moring LLP

(57) ABSTRACT

A pneumatic or electromagnetically actuated disc brake includes a caliper spanning a brake disc, a brake application unit disposed in the caliper and having a brake lever, at least one actuating spindle axially displaceable by the rotary lever, and a wear adjustor actuated by the brake lever and positioned in the brake caliper, by which a wear-induced change in an air gap between a brake pad and the brake disc can be substantially compensated for by way of an axial adjustment of the actuating spindle. The wear adjustor includes a spur gear segment extending in the pivot direction and disposed on the lever and engaging with a crown gear operationally connected to the actuating spindle for adjusting.

5 Claims, 2 Drawing Sheets

PNEUMATICALLY OR ELECTROMECHANICALLY ACTUATED DISC BRAKE

CROSS-REFERENCE TO RELATED APPLICATIONS

This application is a continuation of PCT International Application No. PCT/EP2010/002339, filed Apr. 16, 2010, which claims priority under 35 U.S.C. §119 from German Patent Application No. DE 10 2009 018 223.3, filed Apr. 21, 2009, the entire disclosures of which are herein expressly incorporated by reference.

BACKGROUND AND SUMMARY OF THE INVENTION

The invention relates to a pneumatically or electromechanically actuated disc brake having a brake caliper straddling a brake disc, a brake application device arranged in the brake caliper and comprising a rotary brake lever, at least one adjusting spindle, which is axially moveable by way of the brake application device, and an adjusting device, which is actuated by the brake lever and positioned in the brake caliper, and which serves, via an axial adjustment of the adjusting spindle, substantially to compensate for a wear-induced variation of the lift clearance between a brake pad and the brake disc.

Such a disc brake is disclosed, for example, by DE 94 22 342 U1, and by DE 10 2004 037 771 A1. Each of these documents shows and describes an adjusting device for a pneumatically actuated disc brake, in particular one of a sliding caliper design, which can also be used, however, in pneumatically actuated fixed or hinged caliper disc brakes.

Such an adjusting device serves to perform an automatic wear adjustment, so that the so-called "lift clearance," by which is meant the gap between the brake pads and the brake disc in the non-actuated state, is kept constant irrespective of the state of wear and the wear pattern of the brake pads.

In the known disc brakes, adjusters, one of which is driven by a brake lever via a drive element, are arranged in the adjusting spindles in the form of threaded tubes. The drive element comprises two shifting pins, which engage in a shift fork of the adjuster of the adjusting spindle.

In a braking sequence, the brake lever coupled to a piston rod of a brake cylinder performs a pivoting or rotating movement, which after overcoming a so-called idle travel turns the adjuster and thereby the adjusting spindle. The brake lever hitherto used is manufactured by forging, the shifting pins being forged on in the process.

However, the known design has a number of quite serious disadvantageous. For example, a constant transmission over the entire pivoting range of the brake lever is not possible. Furthermore, due to the given tolerances, the play in the adjusting spindle drive, which at the same time represents the lift clearance between the brake disc and the brake pads, can only be adjusted very imprecisely.

Moreover, such a forging of the brake lever is considerably more complicated and, hence, more expensive to manufacture than a casting, it having so far proved impossible to form the known brake lever as a casting, owing to the configuration of the connected shifting pins, particularly in view of the required strength and the overall space available.

The object of the invention is to further develop a disc brake of the above-mentioned type, so as to improve its functionality and to allow more cost-effective manufacturing.

This object is achieved by a disc brake having a brake caliper straddling a brake disc, a brake application device arranged in the brake caliper and comprising a rotary brake lever, at least one adjusting spindle, which is axially moveable by way of the brake application device, and an adjusting device, which is actuated by the brake lever and positioned in the brake caliper, and which serves, via an axial adjustment of the adjusting spindle, substantially to compensate for a wear-induced variation of the lift clearance between a brake pad and the brake disc. The adjusting device includes a spur gear segment, which extends in the pivoting direction and is arranged on the brake lever, and which for adjustment purposes engages with a crown wheel operatively connected to the adjusting spindle.

The spur gear segment/crown wheel pairing is virtually free of play and produces a constant transmission over the entire pivoting range of the lever. The adjustment behavior of the entire brake is thereby considerably improved. The adjusting spindle is driven more precisely, which results in a more accurate adjustment of the lift clearance. This is preferably achieved by way of a shifting link in the adjusting spindle.

In addition, the invention allows the brake lever to be manufactured by casting, the spur gear segment, which extends in the pivoting direction of the brake lever, being cast on. Moreover, the brake lever can largely be used without intricate machining, at least in terms of the formed-on spur gear segment.

According to an advantageous development of the invention, the crown wheel is rotationally fixed on a central drive spindle, which is arranged between two adjusting spindles and which is connected to the adjusting spindles by way of a shifting link, that is to say a transmission mechanism.

Forming the brake lever as a casting with an integral spur gear segment allows it to be designed, for the same load-bearing capacity, with dimensions no greater than the hitherto forged-on shift fingers, so that it is possible to optimize the disc brake in terms of the functionality of the adjusting device, whilst retaining or possibly even reducing the current overall size.

The manufacturing costs of the brake lever, however, are much less than the existing forged brake lever. Significant advantages also accrue, in particular, in as much as disc brakes are used in large quantities.

Other objects, advantages and novel features of the present invention will become apparent from the following detailed description of one or more preferred embodiments when considered in conjunction with the accompanying drawings.

DETAILED DESCRIPTION OF THE DRAWINGS

Figure 1:
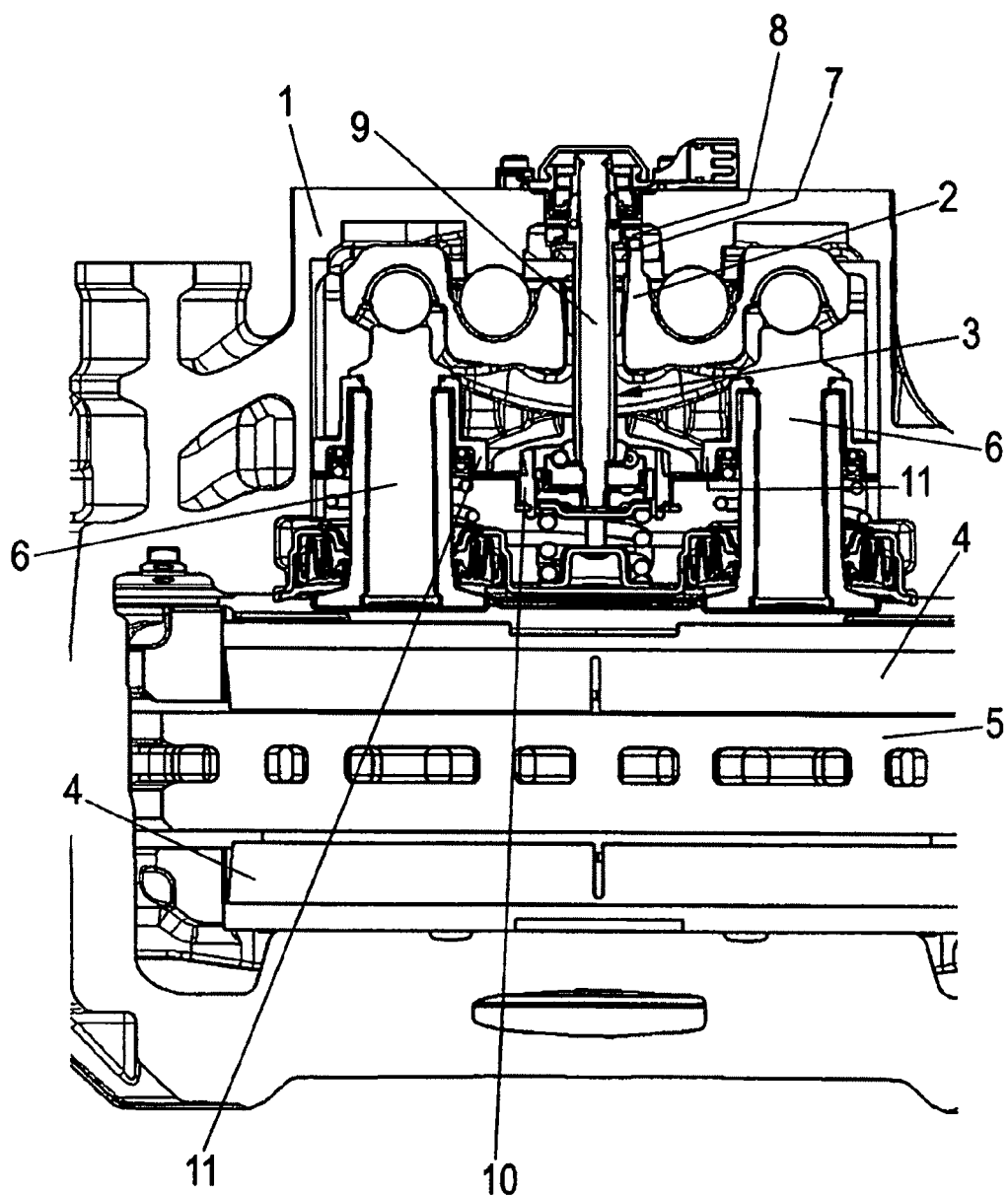
FIG. 1 is a schematic, partial sectional top view of a disc brake according to the invention.

FIG. 1 represents a pneumatically or electromechanically actuated disc brake, particularly for a commercial vehicle, having a brake caliper 1 spanning a brake disc 5. A brake lever 2 of a brake application device serves to press brake pads 4 against the brake disc 5. The brake lever 2 serves to press two adjusting spindles 6, arranged parallel to one another and at an interval from one another, under axial adjustment against the associated brake pad 4.

Arranged in the brake caliper 1 is an adjusting device 3, which is actuated by the brake lever 2. The adjusting device 2 serves, via an axial adjustment of the adjusting spindles 6, substantially to compensate for a wear-induced variation of the lift clearance between the brake pad 4 and the brake disc 5.

The adjusting device 3 has a central drive spindle 9, which runs parallel to the adjusting spindles 6 and on which a drive element 10 in the form of a gear wheel is held rotationally fixed. The gear wheel is associated with two transmission wheels 11, which are likewise embodied as gear wheels and which are each fixed to a respective adjusting spindle 6.

Figure 2:
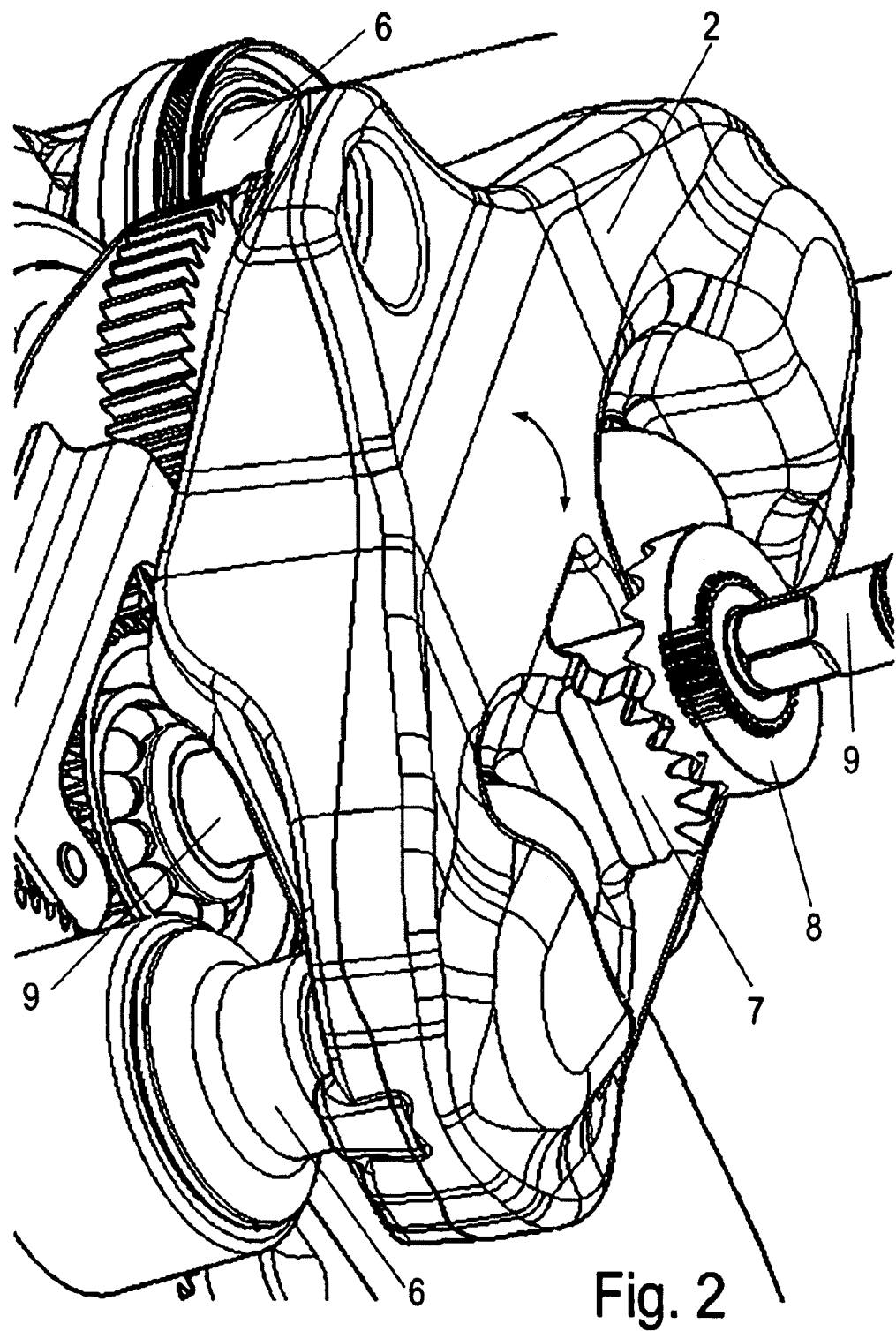
FIG. 2 is a perspective view of a part of the disc brake.

Rotationally fixed to the drive spindle 9 for rotating it, on the side remote from the drive element 10, is a crown wheel 8, in which a spur gear segment 7, formed on to the brake lever 2, engages (see FIG. 2).

The spur gear segment 7 extends in the pivoting direction of the brake lever 2 as indicated by the arrow. Upon each actuation of the brake lever 2, the spur gear segment causes a rotation of the crown wheel 8 and, hence, of the drive spindle 9. The spur gear segment 7 is an integral part of the brake lever 2, which may be formed as a one-piece casting.

The foregoing disclosure has been set forth merely to illustrate the invention and is not intended to be limiting. Since modifications of the disclosed embodiments incorporating the spirit and substance of the invention may occur to persons skilled in the art, the invention should be construed to include everything within the scope of the appended claims and equivalents thereof.

What is claimed is:

1. A pneumatically or electromechanically actuated disc brake having a brake disc, comprising:
    a caliper which, in use, straddles the brake disc;
    a brake application device having a rotary lever and at least one axially movable adjusting spindle, the brake application device being arranged in the caliper; and
    a drive spindle operatively configured to drive the at least one axially movable adjusting spindle, wherein a crown wheel is rotationally fixed to the drive spindle;
    a transmission mechanism via which the drive spindle drives the adjusting spindle; and
    a spur gear segment extending in a pivoting direction of the rotary lever and being integrally connected to the rotary lever, the spur gear segment being arranged to engage the crown wheel,
    wherein
        when the rotary lever is actuated the drive spindle drives an axial adjustment of the at least one adjusting spindle, serving to compensate for a wear-induced variation of a lift clearance between a brake pad and the brake disc,
        the rotary lever is a cast lever, and
        the drive spindle is rotatably supported between two adjusting spindles, the at least one adjusting spindle comprises two adjusting spindles arranged parallel to and spaced apart from one another.

2. The disc brake according to claim 1, wherein the spur gear segment is cast integrally with the rotary lever.

3. The disc brake according to claim 1, further comprising:
    a drive spindle on which the crown wheel is rotationally fixed.

4. The disc brake according to claim 1, wherein the transmission means comprises
    a gear wheel arranged on the adjusting spindle for rotating the adjusting spindle; and
    a further gear wheel rotationally fixed on the drive spindle;
    wherein the further gear wheel engages with the gear wheel arranged on the adjusting spindle for rotating the adjusting spindle.

5. A component of a brake application device having an axially movable adjusting spindle and a wear adjustor that axially adjusts the adjusting spindle to compensate for wear-induced variation of a lift clearance between a brake pad and a brake disc of a disc brake, the component comprising:
    a rotary lever at one end of which the rotary lever is engageable for rotation thereof and at another end of which is an axis about which the rotary lever pivots;
    wherein the other end of the rotary lever is wider than the one end;
    wherein a spur gear segment is arranged in a mid-portion of the width of the other end of the rotary lever, the spur gear segment having an operative curvature extending in a pivoting direction of the rotary lever, and
    wherein the rotary lever and spur gear segment are an integral cast component.

* * * * *